United States Patent
Kawarai et al.

(10) Patent No.: US 7,304,946 B2
(45) Date of Patent: Dec. 4, 2007

(54) PACKET MULTIPLEXING CONTROL METHOD AND A CONCENTRATOR USING THE SAME

(75) Inventors: Kenichi Kawarai, Kawasaki (JP);
Katsuhiko Nakamoto, Kawasaki (JP);
Takumi Maruyama, Kawasaki (JP);
Hiroyuki Kaneko, Kawasaki (JP);
Osamu Tsurumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 861 days.

(21) Appl. No.: 10/108,204

(22) Filed: Mar. 27, 2002

(65) Prior Publication Data

US 2003/0081602 A1    May 1, 2003

(30) Foreign Application Priority Data

Oct. 29, 2001  (JP)  .............................. 2001-331320

(51) Int. Cl.
*H04L 12/26* (2006.01)
(52) U.S. Cl. .................... 370/230; 370/229; 370/474
(58) Field of Classification Search ................ 370/229,
370/230, 338, 351, 389, 392, 395.1, 396–399,
370/412–420, 465–467, 469, 474; 711/216
See application file for complete search history.

(56) References Cited

U.S. PATENT DOCUMENTS

| | | | | |
|---|---|---|---|---|
| 5,946,313 | A * | 8/1999 | Allan et al. | 370/397 |
| 6,122,252 | A * | 9/2000 | Aimoto et al. | 370/235 |
| 6,144,636 | A * | 11/2000 | Aimoto et al. | 370/229 |
| 6,633,569 | B2 * | 10/2003 | Hemmady | 370/398 |
| 6,798,746 | B1 * | 9/2004 | Kloth et al. | 370/235 |
| 6,865,154 | B1 * | 3/2005 | Charny et al. | 370/235 |
| 7,012,890 | B2 * | 3/2006 | Yazaki et al. | 370/229 |

* cited by examiner

*Primary Examiner*—Wing Chan
*Assistant Examiner*—Mark A. Mais
(74) *Attorney, Agent, or Firm*—Katten Muchin Rosenman LLP

(57) ABSTRACT

A packet multiplexing control method and equipment using the method are realized by a simple control method with reduced hardware, enabling to provide low cost, efficient and fair bandwidth control corresponding to traffic characteristic of users. The packet multiplexing control method includes the steps of extracting a header part in each packet data received from a plurality of terminals; learning an address in the extracted header part; and controlling either admission processing or discard processing of the received packet according to the result of learning the address.

8 Claims, 13 Drawing Sheets

FIG. 8A

| | a | b | c | d |
|---|---|---|---|---|
| | Enable flag | Arrival monitoring flag | Retrieval key | Transmission counter |
| Entry#1 | 1 | 0 | ADR#9 | 0 |
| Entry #2 | 1 | 1 | ADR#7 | 6 |
| ... | ... | ... | ... | ... |
| Entry #x | 1 | 1 | ADR#8 | 2 |
| ... | ... | ... | ... | ... |
| | 1 | 0 | ADR#10 | 256 |
| Entry #n | 1 | 1 | ADR#32 | 5 |

Initiation learning table (CAM/RAM)

FIG. 8B

| | a | b | c |
|---|---|---|---|
| | Enable flag | Retrieval key | Suspension counter |
| Entry#1 | 0 | ADR#9 | 0 |
| Entry #2 | 1 | ADR#7 | 6 |
| ... | ... | ... | ... |
| Entry #x | 1 | ADR#8 | 2 |
| ... | ... | ... | ... |
| | 0 | ADR#10 | 256 |
| Entry #n | 1 | ADR#32 | 5 |

Suspension learning table (CAM/RAM)

PACKET MULTIPLEXING CONTROL METHOD AND A CONCENTRATOR USING THE SAME

FIELD OF THE INVENTION

The present invention relates to a packet multiplexing control method and equipment therefor, and more particularly a concentrator performing bandwidth control depending on an amount of user traffic.

BACKGROUND OF THE INVENTION

In recent years a broadband service with continuous connection has come of age, enabling a user to utilize an access network for transferring high throughput traffic.

Meanwhile, capacity expansion in a backbone network does not catch up sufficiently with the abrupt traffic increase. From the viewpoint of efficient network usage, a backbone network bandwidth is normally shared by a plurality of users. For this purpose a concentrator is provided in a network to concentrate packets for multiplexing. Furthermore, it is required to install packet multiplexing equipment to enable efficient and fair bandwidth control fit for traffic characteristic.

As a bandwidth control method employed in an Ethernet LAN, a method called CSMA/CD (Carrier Sense Multiple Access with Collision Detection) is widely used.

The CSMA/CD is illustrated in FIG. 1. Any transceivers (TRC1-TRC5 . . . ) being connected to a cable 100 always supervise a carrier signal flowing on cable 100. When either one station is in transmission (from station A to station D in the example shown in FIG. 1), other stations are controlled to postpone the transmission therefrom and to start transmission when each transceiver concerned indicates a condition that no signal is flowing.

Accordingly, in CSMA/CD, it is required to detect whether or not other terminals are in transmission conditions. For this purpose the network is required to provide a broadcasting function. There is a problem that a portion of bandwidths is consumed to perform this broadcasting.

Also, in this CSMA/CD, transmission-timing control for transmitting a packet is necessary on each terminal side. Therefore, when this method is employed straightly in a public network, ordinary good users cannot be protected from a user transmitting extremely large amount of data in high speed with a malicious intent, causing a problem that fair bandwidth control is impeded.

Meanwhile, as a method for bandwidth control for the public network, there has been used UPC (Usage Parameter Control) as well as the integrated and differentiated service. Such a method is employed in concentrators 2-1, 2-2 shown in FIG. 2. In a network shown in FIG. 2, a packet is transmitted from a terminal 1 located in user premises through an access line. The packet is then multiplexed by a multiplexing controller 10 provided in each multi-stage concentrator 2-1, 2-2. Thus the packet reaches a contents server and a central office (CO) 3 connecting to the Internet 4.

Packet-multiplexing controller 10 provided in such concentrators 2-1, 2-2 classifies traffic flow on a connection-by-connection basis in a packet classifier 11, as shown exemplarily in FIG. 3. Further, traffic pattern (classified by peak cell rate, average cell rate, burst length, etc.) is specified for each arriving traffic on a basis of each connection, flow, and class by presetting in a polisher 12.

Input packets from a plurality of terminals PC1-PC3 are classified in packet classifier 11 into a plurality of traffic flows. These classified traffic flows having arrived from each plurality of users are input to a marker 13. At the same time, according to the previously specified traffic patterns mentioned above, traffic flow rate is monitored in polisher 12.

The monitoring result of traffic arriving from each user by polisher 12 is forwarded to both marker 13 and a discard controller 14. Marker 13 replaces a packet header according to a policy and a traffic flow rate, to forward the packet to a corresponding queue (waiting queue) 16.

Discard controller 14 discards a packet violating the specification of traffic flow rate monitored in polisher 12. Also, discard controller 14 discards a packet depending on the length of queue 16. In addition, scheduler 15 controls to read out queue 16 based on the rate, priority, etc.

As can be understood, the concentrators according to either UPC (User Parameter Control) or the integrated and differentiated service method require a substantially large amount of hardware for monitoring traffic pattern. Also it is required to reserve resources necessary for monitoring in advance.

In case of connectionless communication such as continuous connection, it is required to maintain the number of resources more than the number of users or the maximum number of packet-flows transmitted from each user. This causes a problem of additional increase in hardware, which results in cost increase.

It is currently under study to introduce competition control between quality classes by providing an individual queue on each quality class basis. However this competition control method is effective in possible competition between different quality classes only. The quality class is identical so far as traffic flows within the best-effort class, which presently shares the largest portion among ordinary users. Therefore for such traffic a service control method in order of arrival must be applied, such as a simple FIFO (first in, first out) service method, and therefore it is hardly possible to achieve fair bandwidth control.

Furthermore, data transmitted from one user are generally constituted by a plurality of packets. When concentrator 2 discards packets on occurrence of competition, as shown in FIG. 4, packets from each plurality of users are randomly discarded.

Namely, in the example shown in FIG. 4, discarding packets randomly in the event of competition makes it impossible to receive data thoroughly even from a single user. As a result, packet data from all users must be retransmitted. This is not efficient usage of a network because large retransmission overhead is produced.

SUMMARY OF THE INVENTION

Accordingly, it is an object of the present invention to provide a packet multiplexing control method and a concentrator using the same, enabling efficient and fair bandwidth control according to user traffic characteristic with reduced hardware and cost attained by simplified control. The method aims to be applicable to a public network with sufficient reliability.

As a first embodiment of the present invention to solve the aforementioned problems, the packet multiplexing control method includes the steps of; extracting a header part in each packet data received from a plurality of terminals; learning an address in the extracted header part; and controlling either admission processing or discard processing of the received packet according to the result of the above-mentioned address learning.

As a second embodiment of the packet multiplexing control method according to the present invention, in the first embodiment of the present invention, the above-mentioned address learning procedure comprises the step of retrieving an address from addresses registered in a learning table within a predetermined maximum registerable number by a retrieval key constituted by the address extracted from the header part.

As a third embodiment of the packet multiplexing control method, in the second embodiment of the present invention, the above-mentioned retrieval key is constituted by an address included in either the layer two (L2), the layer three (L3) or higher.

Further, as a first embodiment of a concentrator according to the present invention to solve the aforementioned problems, the concentrator includes; a header extractor for extracting a packet header part in each packet received from a plurality of terminals; an address learning portion for learning the address in the extracted header part; and a discard controller for controlling to admit or discard the received packet according to the address learning result obtained by the address learning portion.

As a second embodiment of the concentrator according to the present invention, in the first embodiment of the concentrator, the above-mentioned address learning portion includes a learning table to retrieve an address from addresses registered in the learning table within a predetermined maximum registerable number by a retrieval key constituted by the address extracted from the header part.

As a third embodiment of the concentrator according to the present invention, in the second embodiment of the concentrator, the retrieval key is constituted by an address included in either the layer two (L2), the layer three (L3) or higher.

As a fourth embodiment of the concentrator according to the present invention, in the second embodiment of the concentrator, the learning table includes an initiation learning table and a suspension learning table, and the above-mentioned initiation learning table further comprises; an enable flag for denoting registration of a received packet as a new arrival packet; an arrival monitoring flag for denoting the packet having been admitted for reception; a retrieval key for denoting an address of the received packet; and a transmission counter value. Here, the transmission counter value is incremented by a predetermined value each time a packet is admitted for reception. When the transmission counter value exceeds a predetermined maximum value, the packet having been registered in the initiation learning table is deleted and is newly registered into the suspension learning table.

As a fifth embodiment of the concentrator according to the present invention, in the first embodiment of the concentrator, the above-mentioned suspension learning table comprises; an enable flag for denoting registration; a retrieval key for denoting a received packet address; and a suspension counter value. At the time of new registration into the suspension learning table, either a predetermined transmission counter value or the value corrected therefrom by a random number is set as the suspension counter value.

As a network having a plurality of concentrators being allocated hierarchically in sequence for multiplex-controlling the packets received from a plurality of terminals to output, each concentrator comprises; an extractor for extracting a header part in each packet received from a plurality of terminals; an address learning portion for learning an address in the extracted header part; and a discard controller for controlling to admit or discard the received packet according to the address learning result obtained by the address learning portion. The address information having been learned in a concentrator located on the upstream side is notified to other concentrator(s) located on the downstream side.

Further scopes and features of the present invention will become more apparent by the following description of the embodiments with the accompanied drawings.

BRIEF DESCRIPTION OF THE DRAWINGS

FIGS. 8A and 8B show diagrams illustrating the contents of learning table portion 21 in the exemplary embodiment shown in FIG. 5.

DESCRIPTION OF THE PREFERRED EMBODIMENTS

The preferred embodiments of the present invention are described hereinafter referring to the accompanied charts and drawings.

Figure 5:
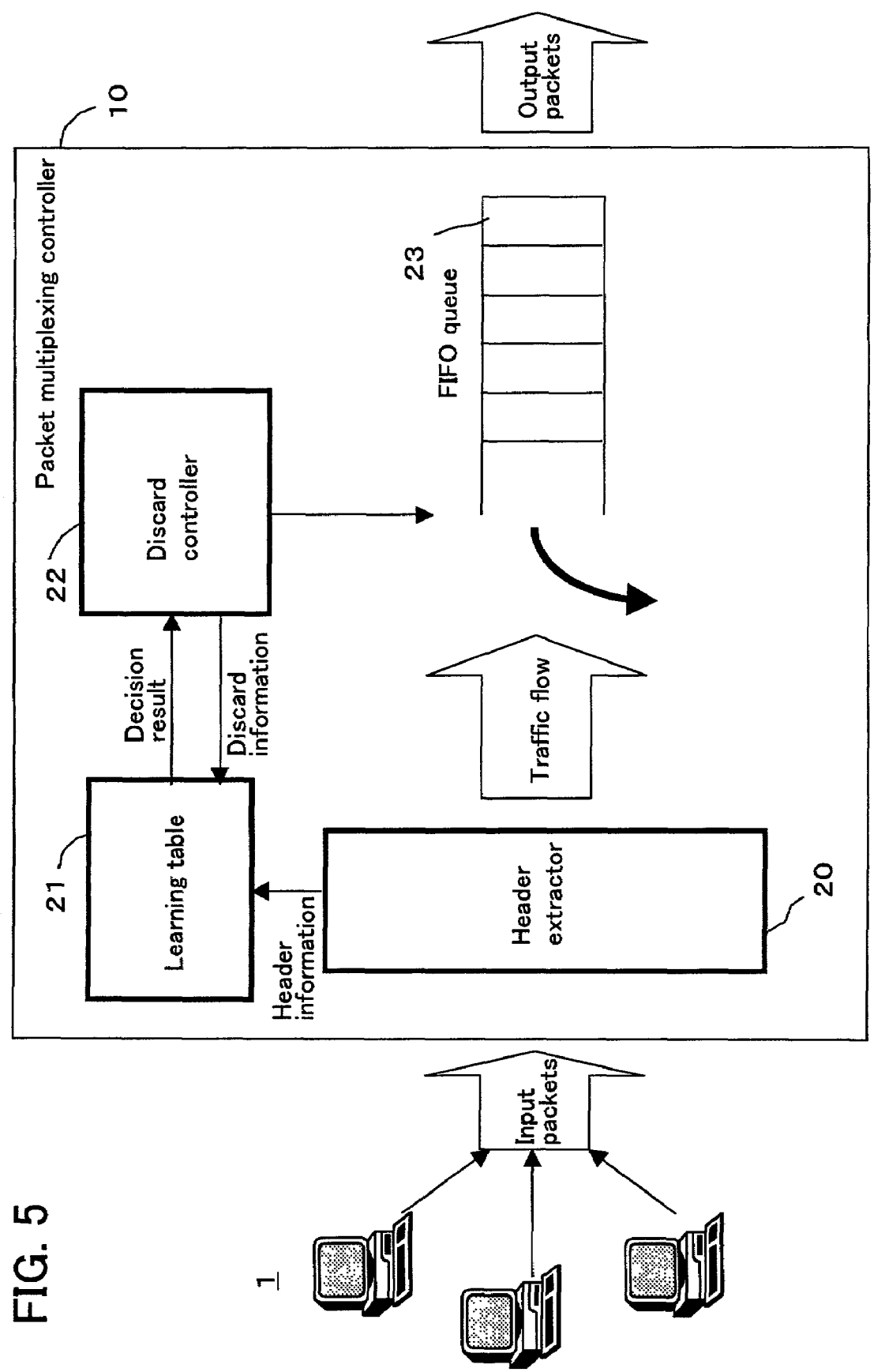
FIG. 5 shows a block diagram of packet multiplexing controller 10 in the concentrator shown in an exemplary embodiment of the present invention.

In FIG. 5, there is shown a block diagram of a packet multiplexing controller 10 provided in a concentrator according to an exemplary embodiment of the present invention.

In FIG. 5, as a feature of the present invention, header extractor 20 extracts header information in each arrival packet from either a plurality of terminals or communication equipment. An address either in the layer two (L2), the layer three (L3) or higher included in the header information is extracted for use as a retrieval key.

The address either in the layer two (L2), the layer three (L3) or higher includes a source address, a destination address, a protocol type of an IP packet, etc.

A learning table portion 21 learns the address in the packet having arrived from a plurality of terminals or communication equipment 1, to forward the learning result to a discard controller 22 as a determination result. Discard controller 22 then controls the length of the queue 23 by means of packet admission control, or a packet discard control, based on the learning result.

Figure 6:
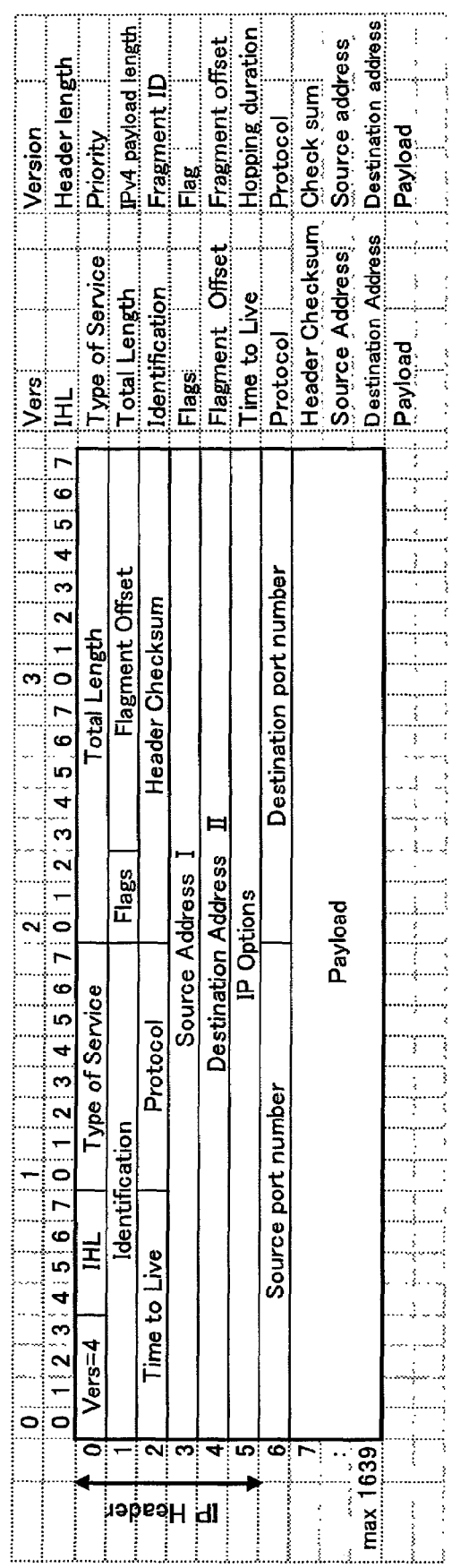
FIG. 6 shows a diagram illustrating header information in an IP packet.

Here, the aforementioned header information includes at least a source address I and a destination address II in an IP packet header as shown in FIG. 6. These addresses are inserted into each IP packet header conforming to a variety of standard frame formats.

Figure 7A:
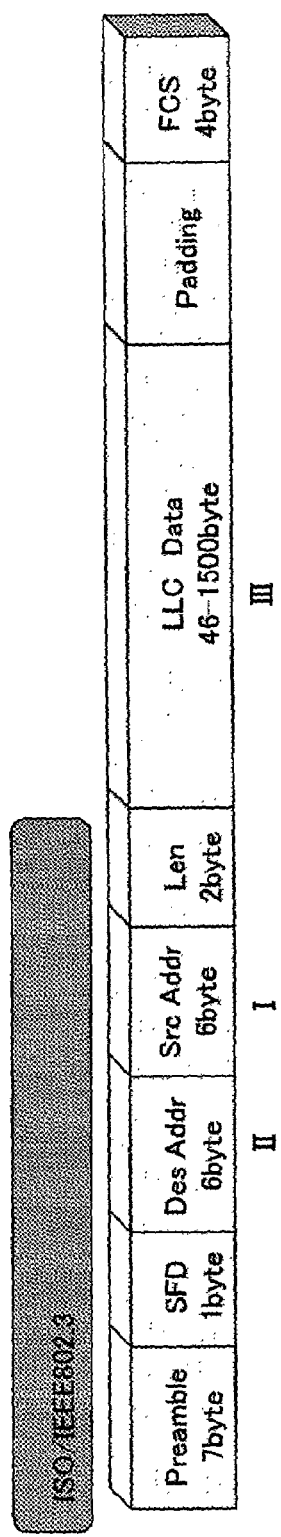
FIGS. 7A through 7C show diagrams illustrating a variety of frame formats.
Figure 7B:
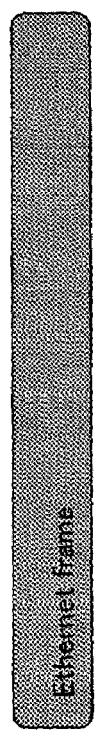
Figure 7C:
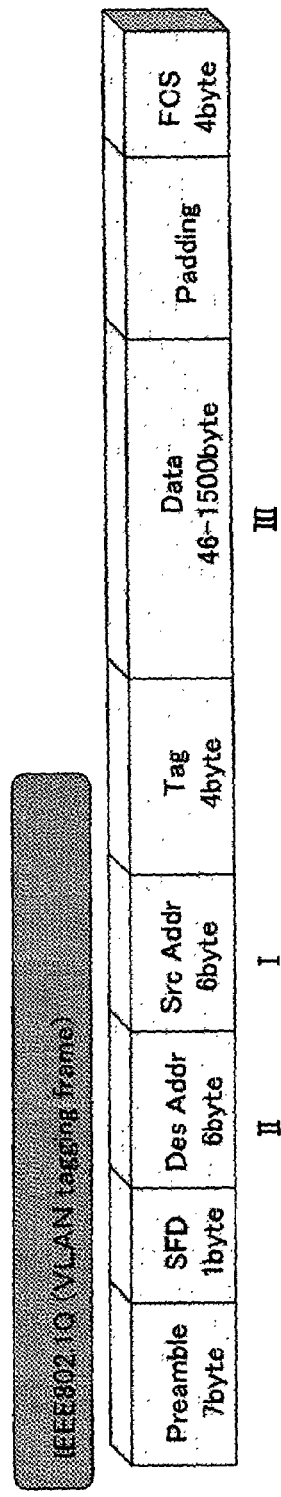

In FIGS. 7A through 7C, there are shown a variety of frame formats. FIG. 7A shows an ISO/IEEE 802.3 frame, FIG. 7B shows an Ethernet frame, and FIG. 7C shows an IEEE 802.1Q frame (VLAN tagged frame), respectively.

In any case, the frame includes source address I, destination address II and data III.

Figure 9:
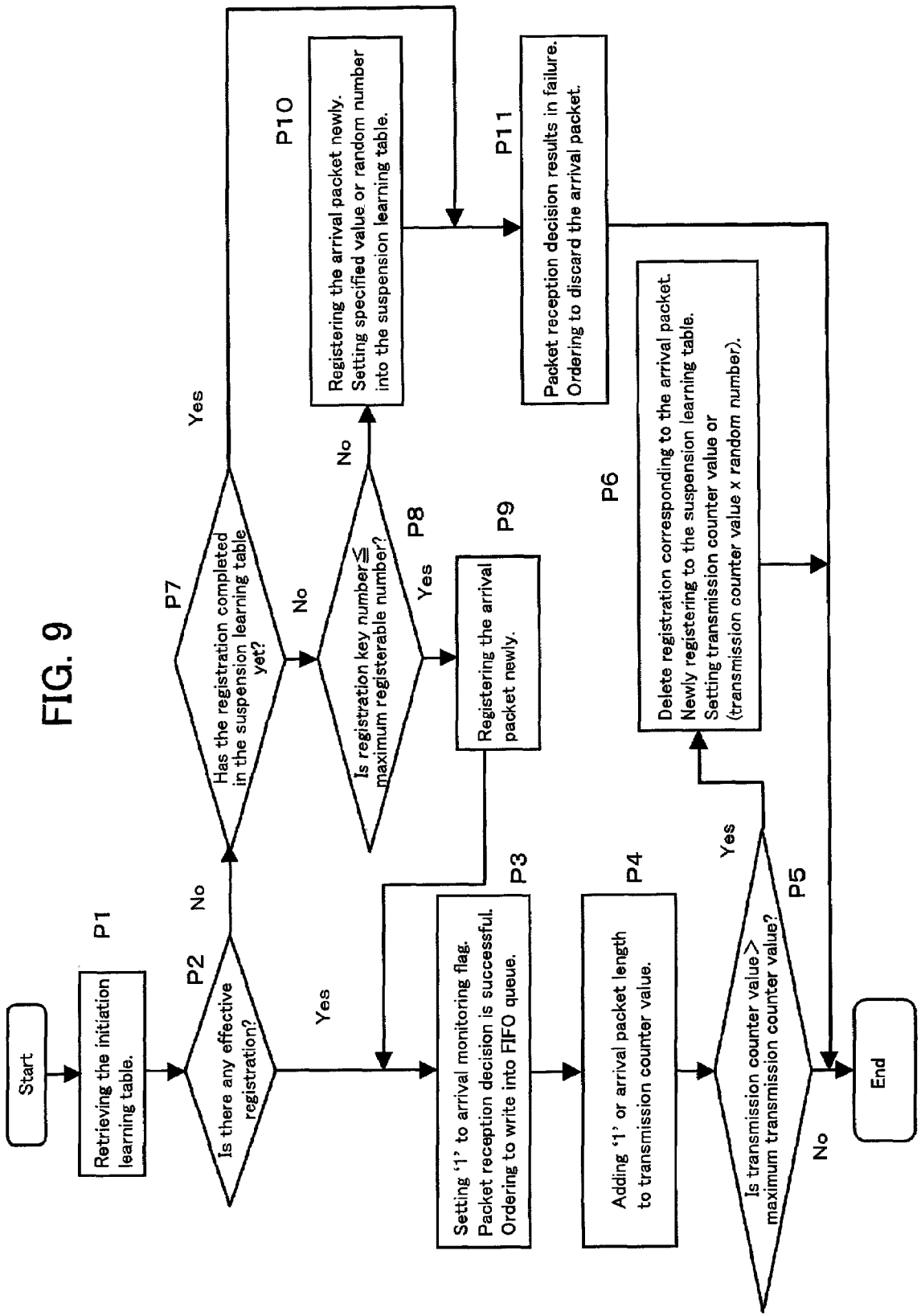
FIG. 9 shows an operation flowchart illustrating the control procedure of the learning table portion.

In FIGS. 8A and 8B, the contents of learning table portion 21 are shown in the embodiment shown in FIG. 5. The control procedure thereof is explained hereafter, referring to the control flowcharts shown in FIGS. 9, 11. A program for controlling to execute the control flow is stored in a memory of learning table portion 21.

In FIG. 8A, learning table portion 21 includes an initiation learning table, and a suspension learning table in FIG. 8B. These learning tables are stored in either a CAM (content address memory) or a RAM. Further, in learning table portion 21, there is stored a program for controlling to execute the control flow shown in FIGS. 9, 11.

It is to be noted that only a portion of the initiation learning table (FIG. 8A) and the suspension learning table (FIG. 8B) are shown. For example, if there are 1,000 addresses corresponding to a retrieval key (c), the initiation learning table (FIG. 8A) is required to have a capacity for storing these addresses. In such a case, it is necessary to retrieve 1,000 addresses in sequence when a conventional retrieving method is employed.

In contrast to such a conventional method, according to a feature of the present invention, an enable flag (a) is set '1' against a retrieval key (c) which has become a retrieval object beforehand so as to restrict retrieval objects (for example, the number of Entry #n=100 addresses). Accordingly the retrieval objects are restricted to these addresses, and thus the retrieval speed can be improved.

In FIG. 5, on receiving a packet input from terminal 1, header extractor 20 extracts header information of the packet concerned. The header information is forwarded to learning table portion 21.

In learning table portion 21, retrieval is carried out in the initiation learning table (FIG. 8A) using an address in either the layer two (L2), the layer three (L3) or higher as a retrieval key (c). Here, the retrieval is targeted on the items in which enable flags (a) are set '1' denoting that the retrieval objects have already been registered (procedure P1 in FIG. 9).

If there is an address consistent with retrieval key (c) in the initiation learning table (FIG. 8A), it is determined that an effective registration exists (procedure P2, Yes). On the other hand if there is no address consistent with retrieval key (c), it is determined there is no effective registration in the initiation learning table (FIG. 8A) (procedure P2, No).

When it is determined there already exists an effective registration, the arrival monitoring flag (b) is set to '1', and the packet reception is decided to be acceptable (i.e. receive admission). Thus it is ordered to write into a FIFO waiting queue 23 (procedure P3).

At the same time, either a transmission counter value is incremented by '1' or the arrival packet length is incremented by '1' (procedure P4). Incrementing the arrival packet length is applied for the equipment configured so that the transmission timing is determined based on the transmission counter value (d) exceeding a predetermined arrival packet length.

Namely, it is determined whether or not transmission counter value (d) exceeds a predetermined maximum counter value (procedure P5).

If transmission counter value (d) remains below the predetermined maximum counter value, the procedure proceeds to the succeeding arrival packet processing. Else if transmission counter value (d) exceeds the predetermined maximum counter value, enable flag (a) in the initiation learning table (FIG. 8A) is reset to '0' to delete the registration. At this moment, either a predetermined counter value or a counter value being corrected by a random number is set into the initiation learning table (FIG. 8A) (procedure P6).

In procedure P2, if an effective registration is not found, an object(s) in the suspension learning table (FIG. 8B) in which enable flag (a) is set is retrieved by retrieval key (b) (procedure P7).

If there is no object consistent with retrieval key (b) (procedure P7, No), then a decision is made whether or not the number of retrieval keys (i.e. the number of items each having enable flag (a) of '1') having been registered in the initiation learning table (FIG. 8A) exceeds the maximum registerable number (procedure P8).

If the number of items having enable flag (a) of '1' does not exceed the maximum registerable number (procedure P8, Yes), an arrival packet is newly registered in the initiation learning table (by setting '1' as an enable flag (a) into the address corresponding to retrieval key (c) (procedure P9). Thereafter the process proceeds back to procedure P3.

Meanwhile, in procedure P7, if there is found an object coincident with retrieval key (b) in the suspension learning table (FIG. 8B), then the packet reception decision results in 'NG' (i.e. reception not admitted). An order is then issued to discard processor 22 (FIG. 5) to discard the packet concerned (procedure P11).

Further, in procedure P8, if the number of items having been registered in the initiation learning table exceeds the maximum registerable number (procedure P8, No), an arrival packet is newly registered in the suspension learning table (FIG. 8B). At this time, either a suspension counter value or a random number value is set into a suspension counter (c) (procedure P10). Moreover, the packet reception decision for the packet concerned results in 'NG' (reception not admitted). An order is then issued to discard processor 22 to discard the packet concerned (procedure P11).

With such a method as described above, according to the present invention, the packet admission control is performed based on the learned addresses. It becomes unnecessary to reserve any resources for a user or a traffic flow being not transmitting any packet. Thus necessary hardware can be reduced.

Also, efficient transfer of traffic can be attained because of the packet admission control guaranteeing continuity for a user or a traffic flow.

Additionally, packets once admitted are learned using the initiation learning table (FIG. 8A), and when receiving consecutive packets, any packet having the identical address may be admitted to receive in a prioritized manner. Accordingly, even when user data are transferred after being divided into a plurality of packets, the continuity of the data transfer can be guaranteed, resulting in reducing the overhead which is otherwise consumed for the retransmission.

Figure 4:
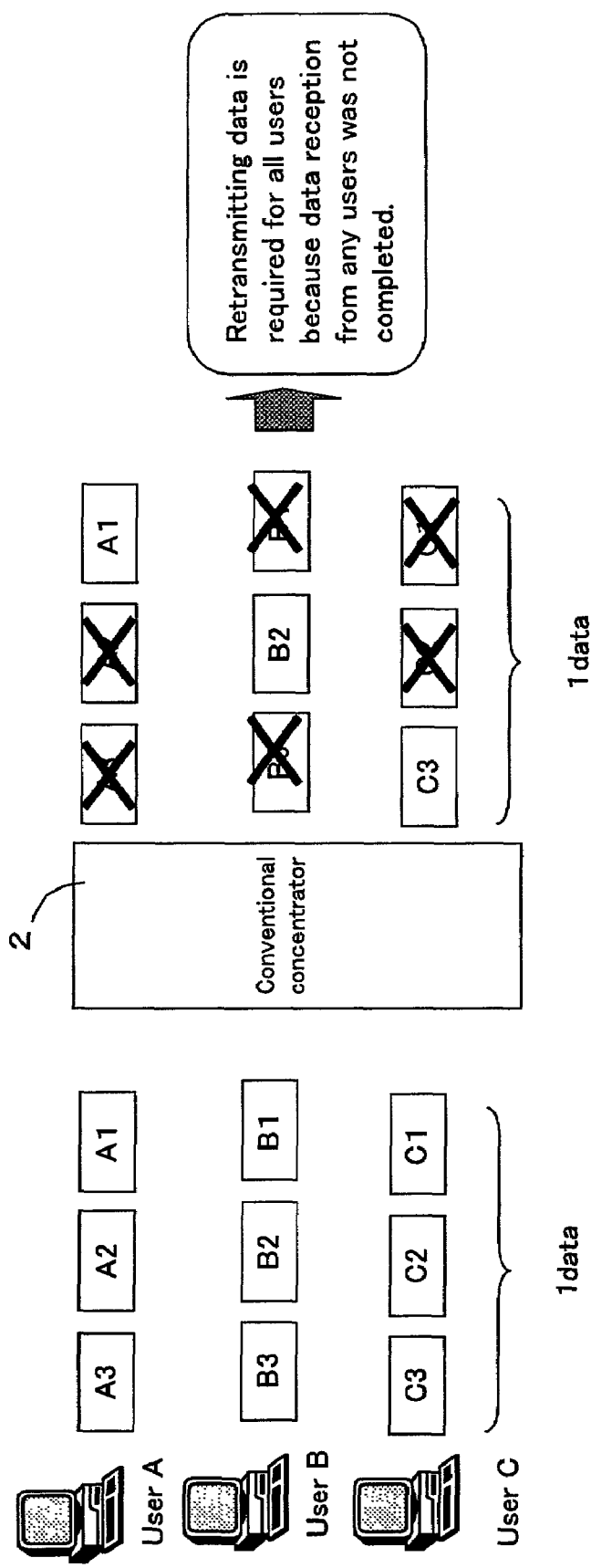
FIG. 4 shows a diagram illustrating a problem of packet discarding at the time of competition occurring in the configuration of FIG. 3.
Figure 10:
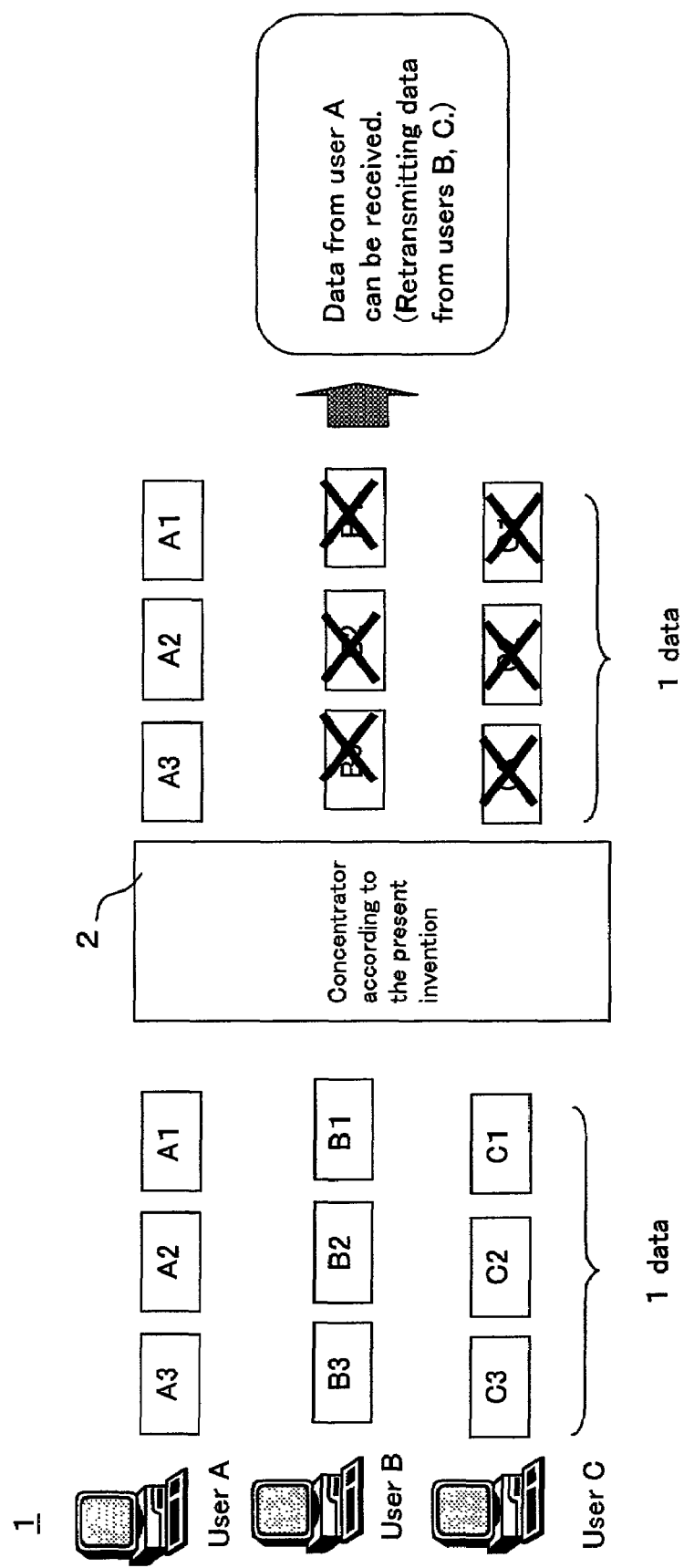
FIG. 10 shows a diagram indicating an effect of the present invention as compared to FIG. 4.

In FIG. 10, there is shown an effect of the present invention as compared to FIG. 4. In regard to at least the data from user A, the transmission is completed. Thus the number of users requiring retransmission decreases, reducing overhead caused by retransmission.

In addition, by learning the packet once rejected to receive using the suspension learning table (FIG. 8B) the reception of succeeding packets having address information identical to the rejected packet is suspended for a certain period (procedures P6, P11). Thus the reception priority is degraded for a certain period. More specifically, the reception priority for a user is degraded once the reception rejection condition occurs against the user concerned. Therefore, even when a malicious user tries to transfer packets at a burst, it becomes possible to maintain bandwidth for other users.

Figure 11:
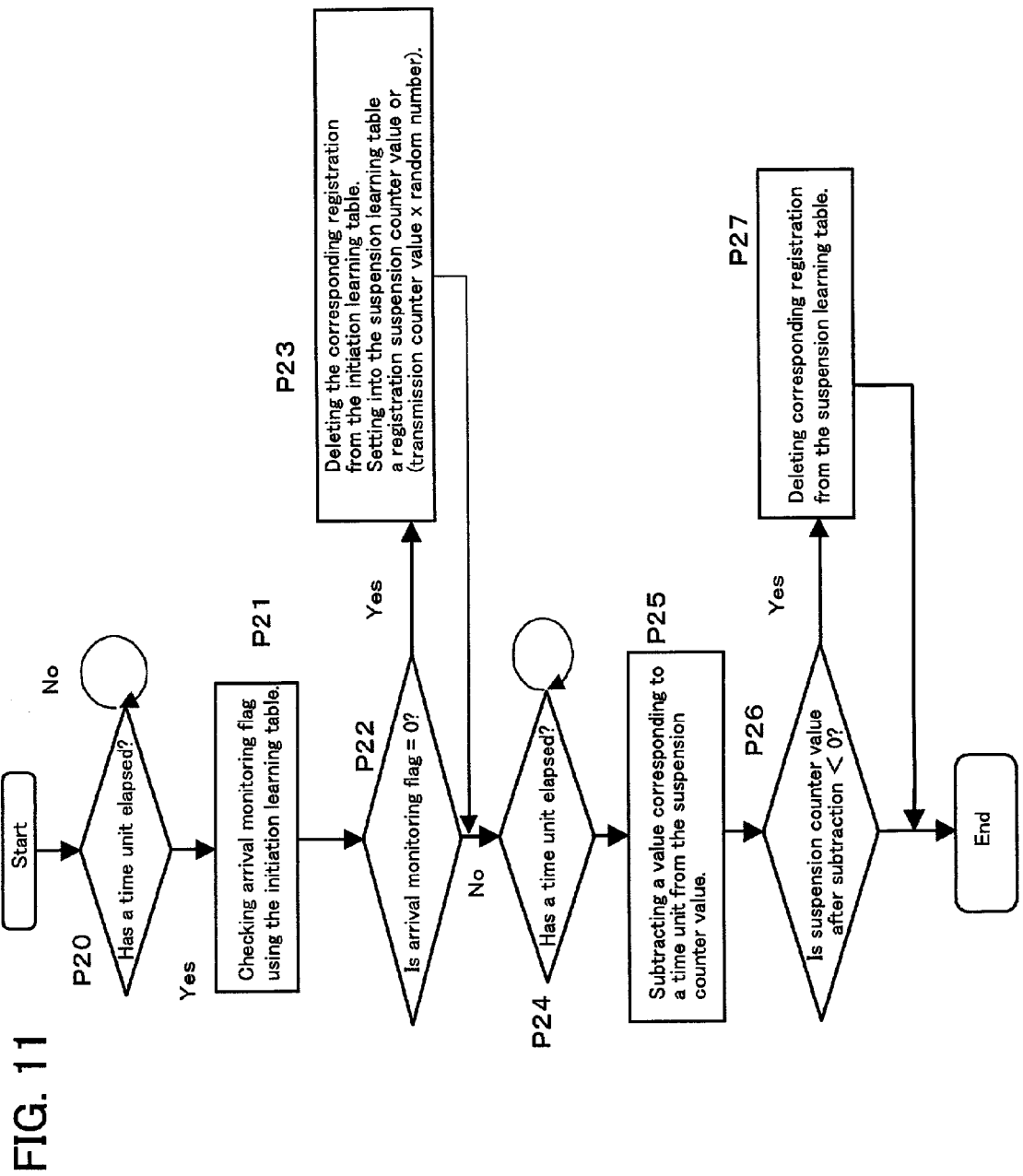
FIG. 11 shows an operation flowchart for updating a retrieval object in a predetermined time in the learning table.

In FIG. 11, there is shown an operation flow of the learning table to update retrieval objects in a predetermined time. When every time unit elapses (procedure P20), an arrival monitoring flag (b) is examined for the items of effective registration (i.e. the items in which enable flag (a) is set '1') in the initiation learning table (FIG. 8A) (procedure P21). If arrival monitoring flag (b) is equal to zero (procedure P22, Yes), the corresponding registration in the initiation learning table is deleted to register newly into the suspension learning table instead. At this time, either a transmission counter value or the value corrected by a random number is set into suspension counter (c) (procedure P23).

Meanwhile, after every time unit elapses (procedure P24), a predetermined value corresponding to the time unit is subtracted from suspension counter (c) of the suspension learning table (FIG. 8B) (procedure P25). If the value of suspension counter (c) becomes negative (procedure P26, Yes), the corresponding registration is deleted from the suspension learning table (procedure P27).

Figure 12:
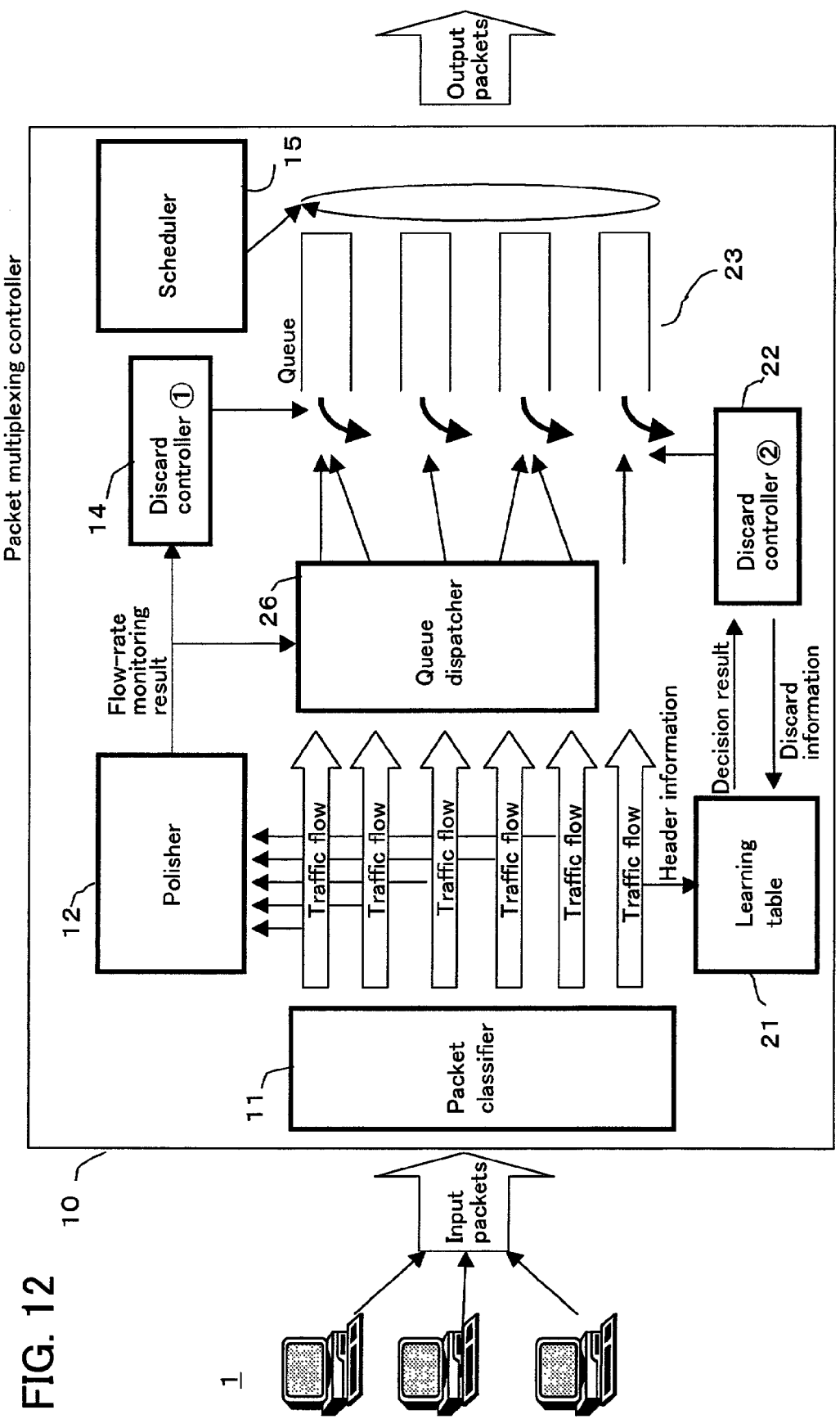
FIG. 12 shows an exemplary embodiment further expanded from the embodiment shown in FIG. 5.

In FIG. 12, there is shown an exemplary embodiment further extended from the embodiment shown in FIG. 5. In the embodiment shown in FIG. 12, packet classifier 11 is also provided for input packets in the same manner as the conventional configuration shown in FIG. 3. The input packets are classified into a plurality of traffic flows. Learning table portion 21 and discard controller 22 are also provided. The method according to the present invention is applied to perform the bandwidth control for either one traffic flow or a plurality of traffic flows.

Figure 3:
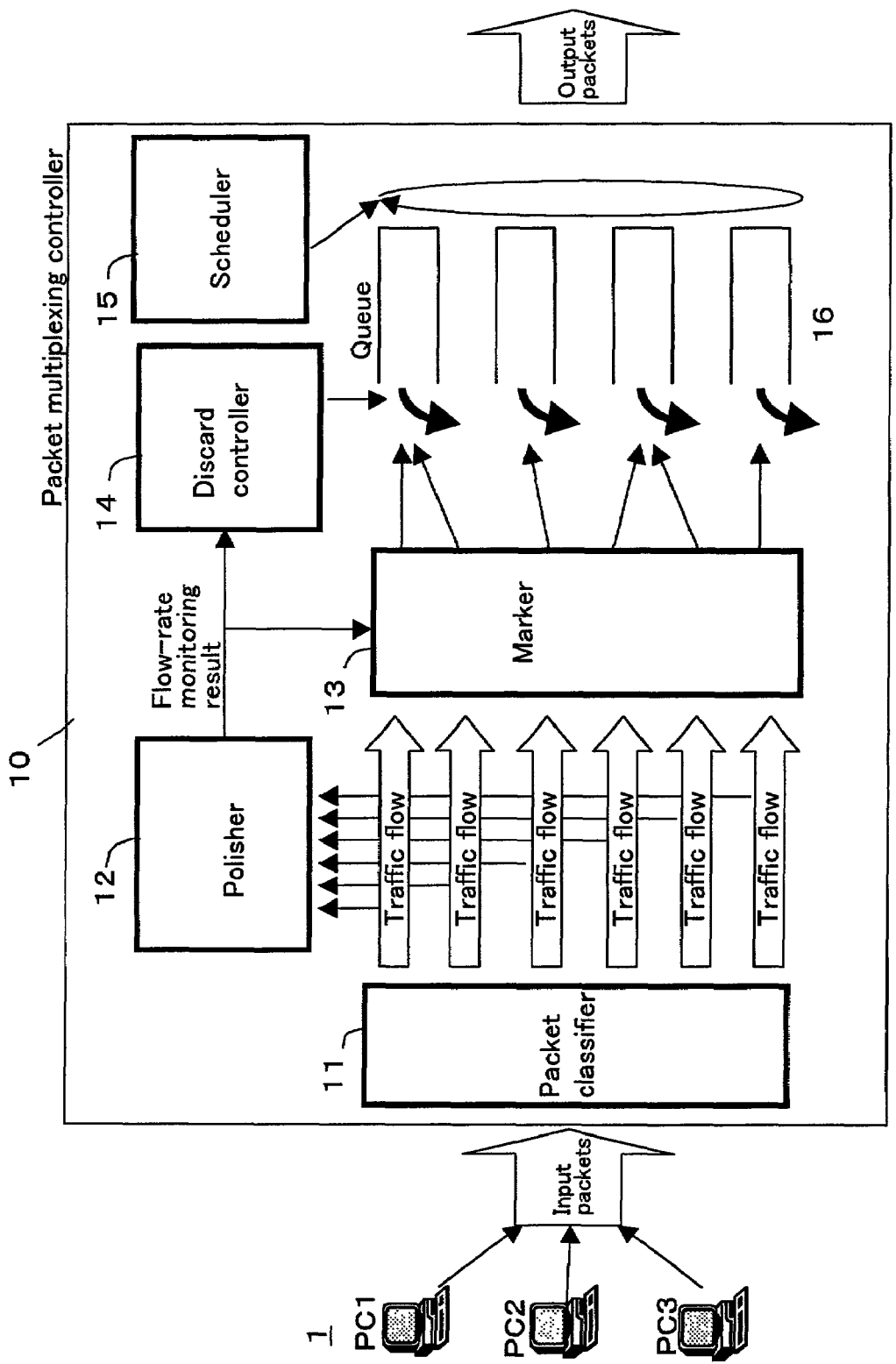
FIG. 3 shows a conventional configuration block diagram of a packet multiplexing controller.

According to this embodiment, it is possible to implement a service of bandwidth guarantee type using the conventional configuration shown in FIG. 3 (i.e. polisher 12, discard controller 14 and scheduler 15). Using learning table portion 21 and discard controller 22 additionally provided according to the present invention, it becomes possible to provide a fair and reliable best-effort service.

Figure 1:
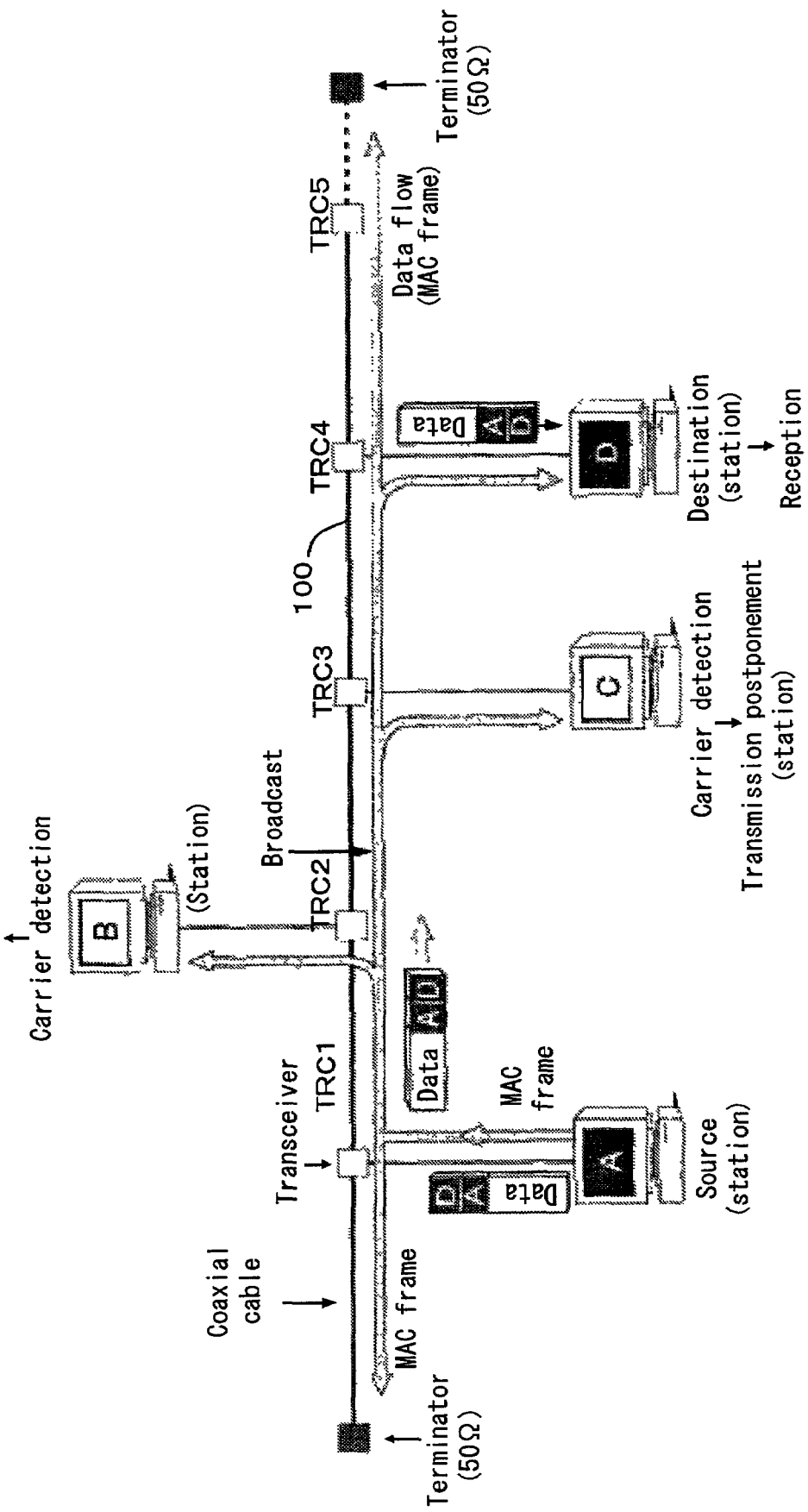
FIG. 1 shows an explanation diagram of the CSMA/CD method.
Figure 2:
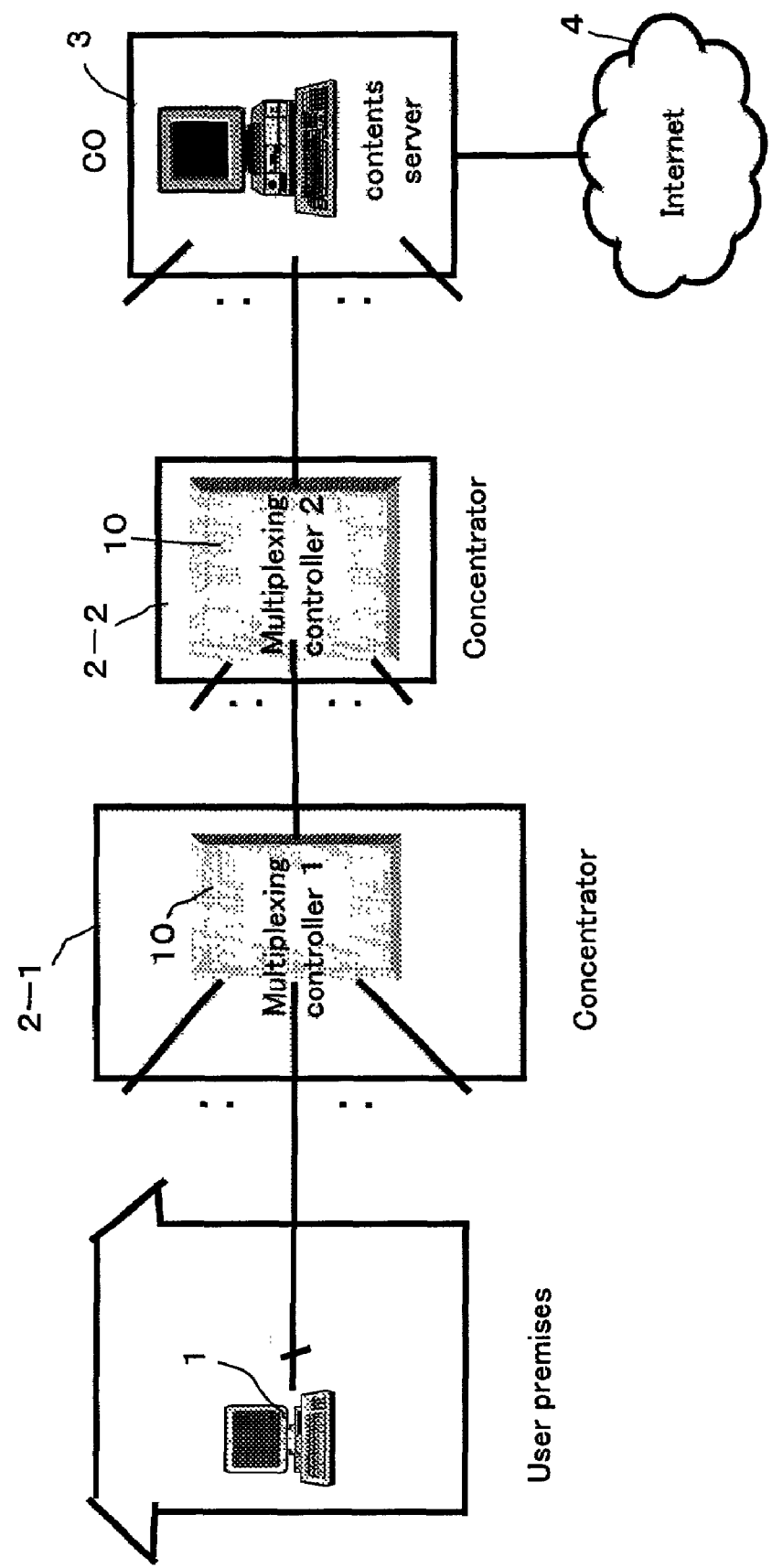
FIG. 2 shows an explanation diagram of an application to a concentrator.
Figure 13:
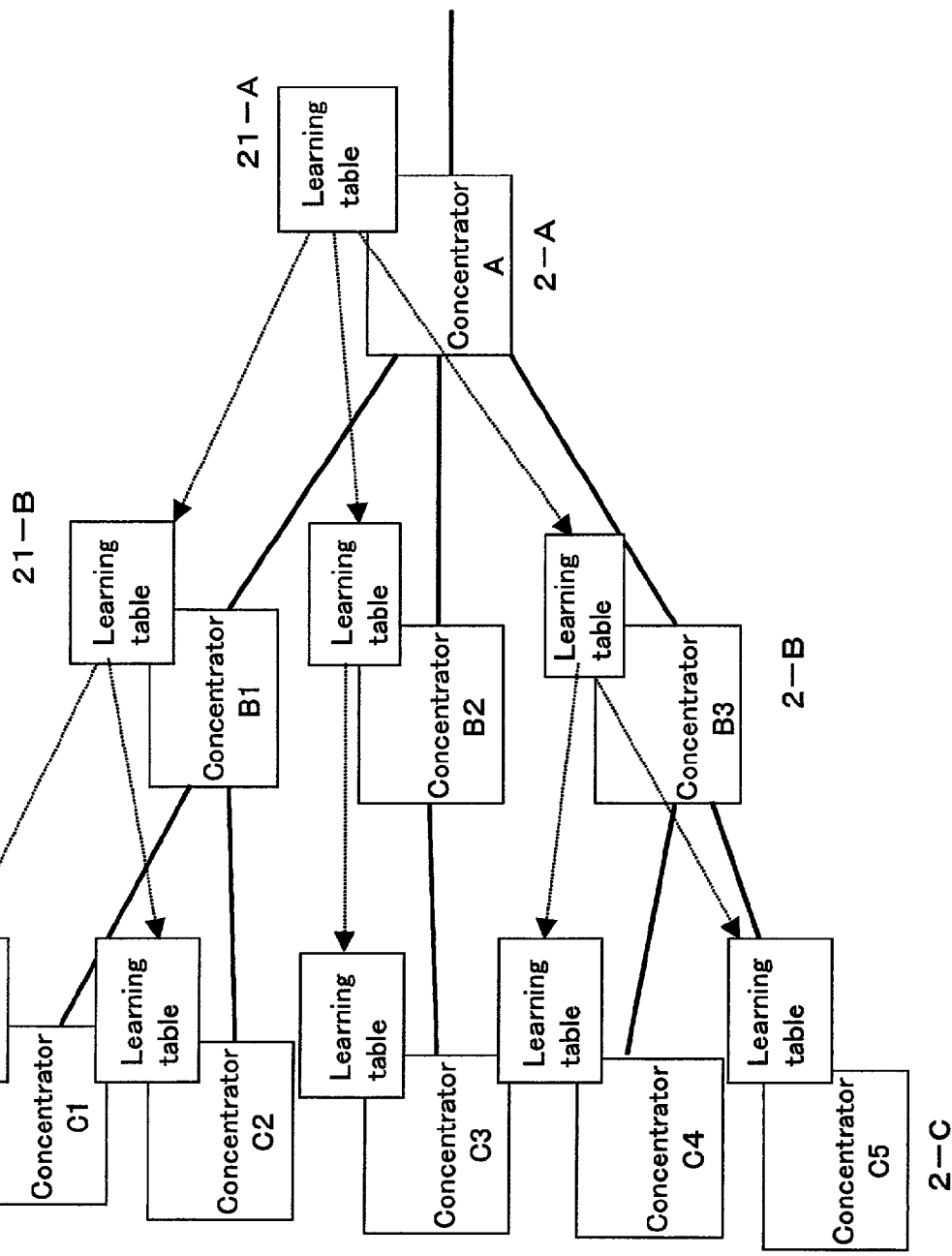
FIG. 13 shows an application example of a network configuration in which a plurality of concentrators 2 are hierarchically allocated compared to the network configuration shown in FIG. 2.

In FIG. 13, there is shown a network configuration as compared to that shown in FIG. 2. Here, a plurality of concentrators 2 are hierarchically allocated in the network. Namely, there are provided a concentrator A located upstream, concentrators B1-B3 located in the middle of the stream, and concentrators C1-C5 located downstream. Each concentrator includes learning table portion 21 and discard controller 22 as shown in FIG. 5 or FIG. 11.

The change in address information in learning table portion 21 of concentrator 2 being located upstream is successively informed to the concentrators being located downstream side. Based on this information, the concentrators located on the downstream side can obtain learning addresses in synchronization with the learning addresses stored in the concentrator on the upstream side. In general, because of a limited amount of hardware, a learning table in the concentrator located on the upstream side is smaller in size than the total of learning tables in the concentrators on the downstream side. Even in such a case, according to the embodiment of the present invention, it becomes possible to prevent useless packet transfer from the downstream side to the upstream side.

At this time, registration alteration information to be transferred from the upstream side to the downstream side includes a table type (initiation learning table or suspension learning table), either registration or deletion to/from each table, retrieval key, and a counter value. Information on the downstream side can be updated by such transferred data.

The embodiments of the present invention have been described referring the accompanied drawings. According to the present invention, a packet multiplexing control method and equipment using the method are realized by a simple control method with reduced hardware, enabling to provide low cost, efficient and fair bandwidth control corresponding to traffic characteristic of users.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A packet multiplexing control method comprising the steps of:
    extracting a header part of each packet input from a plurality of terminals;
    retrieving a first learning table by using an address as a retrieval key, included in the extracted header part for only retrieval objects, which have been set by a first predetermined flag;
    setting an arrival monitoring flag in the first learning table to determine the input packet as receivable if the input packet is determined as effectively registered in the first learning table as a result of the retrieving; and
    setting the receivable input packet in a waiting queue
    retrieving a second learning table for retrieval objects set by a second predetermined flat if the input packet is determined as not registered in the first learning table;
    determining whether or not the number of retrieval keys registered in the first learning table exceeds a predetermined maximum allowable number, if there is no retrieval objects set by the second predetermined flag in the second learning table; and
    setting the first predetermined flag in the first learning table to indicate the input packet as a newly received packet, if the number of registered retrieval keys is less than the predetermined maximun allowable number.

2. The packet multiplexing control method according to claim 1, wherein the retrieval key is constituted by an address included in either the layer two (L2), the layer three (L3) or higher.

3. The concentrator according to claim 1, further comprising a transmission counter value, wherein the transmission counter value is incremented by a predetermined value each time the input packet is determined as receivable, and when the transmission counter value exceeds the predetermined maximum value, the registration data in the first learning table is deleted and is newly registered into the second learning table.

4. The concentrator according to claim 3,
wherein the second learning table includes an enable flag for denoting registration, a retrieval key for denoting a received packet address, and a suspension counter value, and
wherein, at the time of new registration into the second learning table, either a predetermined transmission counter value or the predetermined transmission counter value corrected by a random number is set as the suspension counter value.

5. The packet multiplexing control method according to claims 1,
wherein in the step of retrieving the second learning table, if there is any retrieval object set by the predetermined second flag in the second learning table, the input packet is discarded.

6. A concentrator for multiplex-controlling packets input from a plurality of terminals to output, comprising:
a header extractor extracting a header part of each packet input from a plurality of terminals;
a first learning table, which is retrieved by an address as a retrieval key included in the extracted header part, for objects set by a first predetermined flag, wherein if the input packet is determined as effectively registered in the first learning table as a result of retrieving, an arrival monitoring flag is set in the first learning table to determine the input packet as receivable; and
a FIFO memory forming a waiting queue setting the receivable input packet
a second learning table, which is retrieved for retrieval objects set by a second predetermined flag if the input packet is determined as not registered in the first learning table,
wherein if there is no retrieval objects set by the second predetermined flap in the second learning table, it is determined whether or not the number of retrieval keys registered in the first learning table exceeds a predetermined maximum allowable number, and if the number of registered retrieval keys is less than the predetermined maximum allowable number, the first predetermined flag is et in the first learning table to indicate the input packet as a newly received packet.

7. The concentrator according to claim 6, wherein the retrieval key is constituted by an address included in either the layer two (L2), the layer three (L3) or higher.

8. The concentrator according to claim 6, wherein if the second learning table includes any retrieval object set by the second predetermined flag, the input packet is discarded.

* * * * *